United States Patent [19]

Kawakami et al.

[11] 3,817,954

[45] June 18, 1974

[54] PROCESS FOR PRODUCING CONJUGATED DIENE POLYMERS

[75] Inventors: Masato Kawakami; Yoshinori Yoshida; Chihiro Nozaki; Hideki Imai, all of Yokkaichi, Japan

[73] Assignee: Japan Synthetic Rubber Co., Ltd., Tokyo, Japan

[22] Filed: Apr. 18, 1973

[21] Appl. No.: 352,455

[30] Foreign Application Priority Data
Apr. 21, 1972   Japan.............................. 47-39648

[52] U.S. Cl.............. 260/82.1, 260/84.3, 260/84.7, 260/94.2 M, 260/94.4, 260/94.6
[51] Int. Cl. ....................... C08d 1/32, C08f 19/06
[58] Field of Search........... 260/94.2 M, 94.6, 94.4, 260/84.7, 84.3, 82.1

[56] References Cited
UNITED STATES PATENTS
3,301,840   1/1967   Zelinski......................... 260/94.2 M
3,498,960   3/1970   Wofford............................ 260/84.7
3,642,734   2/1972   Cheng et al....................... 260/94.6

Primary Examiner—James A. Seidleck
Attorney, Agent, or Firm—Craig & Antonelli

[57]   ABSTRACT

A conjugated diene polymer having a high cis-1,4 configuration content and having a high molecular weight can advantageously be produced by homopolymerizing or copolymerizing at least one conjugated diene or copolymerizing at least one conjugated diene with at least one vinyl aromatic hydrocarbon with a catalyst consisting essentially of at least one organolithium compound and at least one aliphatic nitrile in a proportion of 0.01 to 1.0 mole of the aliphatic nitrile per carbon-linked lithium atom and optionally carbon disulfide as promoter. The vulcanizate of said polymer of isoprene is very similar in physical properties to that of a natural Hevea rubber.

18 Claims, No Drawings

PROCESS FOR PRODUCING CONJUGATED DIENE POLYMERS

This invention relates to a process for producing conjugated diene polymers by use of a novel catalyst.

A process for producing conjugated diene polymers by use of lithium metal or an organolithium compound as a polymerization catalyst has already been known hitherto, and isoprene polymers, butadiene polymers, butadiene-styrene copolymers and isoprene-butadiene copolymers can be produced according to such a prior art process.

It is also well known that conjugated diene polymers vary in chemical and physical properties depending on the difference in microstructural composition of polymerized conjugated diene portions. In case conjugated diene polymers are produced with an aim to utilize them for industrial purposes, therefore, it is essential to suitably control the molecular weights of the polymers and the microstructural compositions of the polymerized conjugated diene portions according to the uses thereof and to the procedures adopted for the processing thereof. For example, isoprene polymers extremely high in cis-1,4 configuration content have been put into wide uses because they are not only favorable in processability when utilized for industrial purposes but also give vulcanizates which are markedly excellent in abrasion resistance, repulsive elasticity, tear strength and tensile strength. However, the process for producing conjugated diene polymers by use of lithium metal or an organolithium compound as a polymerization catalyst has had such a drawback that the microstructural compositions of the polymerized conjugated diene portions cannot be sufficiently increased in cis-1,4 configuration content. For example, in the case of an isoprene polymer, it is difficult for the cis-1,4 configuration content to exceed 92 % in spite of much efforts, and in the case of a butadiene polymer, the cis-1,4 configuration content is at most about 50 %. Moreover, in such conventional process, the amount of the lithium metal or organolithium compound catalyst used as a great influence not only on the molecular weight of the resulting polymer but also on the microstructural composition of the polymerized conjugated diene portion. Accordingly, the increase in amount of the catalyst used necessarily brings about the decrease in molecular weight and cis-1,4 configuration content of the resulting polymer. This tendency is particularly marked in the case of such an easily hydrocarbon-soluble organolithium compound catalyst as n-butyllithium. In the production of conjugated diene polymers having a high cis-1,4 configuration content, therefore, the catalyst concentration is required to be maintained extremely low, so that even when carefully purified starting materials are used, there are brought about such drawbacks that the polymerization rate and polymerization yield are unstable to give disadvantageous results.

An object of the present invention is to provide an industrially advantageous process for producing conjugated diene polymers particularly high in cis-1,4 configuration content, overcoming the above-mentioned drawbacks of the conventional process for producing conjugated diene polymer by use of a lithium metal or organolithium compound catalyst.

The present inventors previously provided processes for producing conjugated diene polymers having a high cis-1,4 configuration content by use of a catalyst consisting of an organolithium compound and carbon disulfide (French Pat. No. 7133520). As a result of extensive research made thereafter, however, the inventors have newly found that a catalyst consisting essentially of at least one organolithium compound and at least one aliphatic nitrile has an excellent effect to improve the above-mentioned processes, and have accomplished the present invention on the basis of said finding.

In accordance with the present invention, there is provided a process for producing a conjugated diene polymer by homopolymerizing or copolymerizing at least one conjugated diene or by copolymerizing at least one conjugated diene with at least one vinyl aromatic hydrocarbon, characterized in that the monomer or monomers are contacted with a catalyst consisting essentially of at least one organolithium compound and at least one aliphatic nitrile represented by the general formula, RCN, wherein R is alkyl of 1 to 6 carbon atoms, in a proportion of 0.01 to 1.0 mole of the aliphatic nitrile per carbon-linked lithium atom (i.e. atom of active lithium), and optionally carbon disulfide in such a proportion that the total of the aliphatic nitrile and the carbon disulfide may be up to 1 mole per carbon-linked lithium atom of the organolithium compound.

According to the present invention, a catalyst consisting essentially of at least one organolithium compound and at least one aliphatic nitrile is used to make it possible to obtain conjugated diene polymers which are higher in cis-1,4 cnfiguration content of the conjugated diene portion than those obtained according to the known processes in which only the organolithium compound is used as a catalyst. Further, the conjugated diene polymers obtained according to the present process, when vulcanized in admixture with such compounding ingredients as, for example, carbon black, processing oil, sulfur, zinc oxide, stearic acid and vulcanization accelerator, can give vulcanizates which are higher in physical strength than those formed from the conjugated diene polymers obtained according to the known processes, and hence can be said to be polymers which are extremely valuable from the industrial standpoint.

In the process of this invention, the molecular weight of the polymer can be adjusted without so much decreasing the cis-1,4 configuration content, by varying suitably the ratio of the organolithium compound to the aliphatic nitrile. Accordingly, neither extremely high molecular weight polymer nor gel is formed and hence blocking of apparatus can be avoided in the case of continuous polymerization.

Moreover, not only the aliphatic nitrile, particularly acetonitrile, is inexpensive, but the catalyst can also be easily prepared by merely mixing the organolithium compound with the aliphatic nitrile. Accordingly, the process of the present invention has such advantages that it can be easily and economically practiced on a commercial scale.

The catalyst used in the present process consists essentially of at least one organolithium compound and at least one aliphatic nitrile represented by the general formula, RCN, wherein R is an alkyl group having 1 to 6 carbon atoms. Examples of the organolithium compound include monolithium compounds such as methyllithium, ethyllithium, n-propyllithium, isobutyllithium, n-butyllithium, sec-butyllithium, n-amyllithium, iso-amyllithium, n-hexyllithium, phenyllithium, naphthyllithium, cyclohexyllithium and cyclopentyllithium, and polylithium compounds such as methylenedilithium, ethylenedilithium, tetramethylenedilithium, pentamethylenedilithium, 1,4-dilithiumbenzene and 1,3,5-trilithiumpentane. These organolithium compounds may be used either singly or in admixture of two or more.

Examples of the aliphatic nitrile include acetonitrile, propionitrile, butyronitrile, valeronitrile, capronitrile and enanthonitrile. These may be used either singly or in admixture of two or more. Among these, acetonitrile is particularly preferable.

Mixing of the organolithium compound with the aliphatic nitrile is carried out at a temperature in the range from −50° C. to 150° C., preferably from 0° C. to 100° C. The proportion of the aliphatic nitrile to the organolithium compound is in the range from 0.01 to 1.0 mole, preferably from 0.05 to 0.6 mole, per carbon-linked lithium atom. If the proportion of the aliphatic nitrile is smaller than 0.01 mole, the effect derived from its use becomes insufficient, while if the said proportion is more than 1.0 mole, the resulting catalyst is greatly degraded in polymerization activity.

The manners for preparation and application of the catalyst used in the present invention are not particularly restricted. For example, the organolithium compound and the aliphatic nitrile may be mixed with each other, and the resulting mixture is brought into contact with a conjugated diene monomer to carry out the polymerization reaction, or the organolithium compound and the aliphatic nitrile are contacted with each other in a conjugated diene monomer or in a solution thereof in a hydrocarbon, thereby carrying out the polymerization reaction.

The amount of the catalyst used is preferably from 0.01 to 100 milligram equivalent, more preferably from 0.1 to 10 milligram equivalent, in terms of carbon-linked lithium of the organolithium compound used for preparation of the catalyst, per mole of the monomer or monomers.

In this invention, the above-mentioned catalyst may be incorporated, if necessary, with such as promoter as carbon disulfide and with such a molecular weight regulator as allenes. When a catalyst system consisting of the organolithium compound, the aliphatic nitrile and carbon disulfide is used, this invention can more effectively be carried out, and even when the total amount of the aliphatic nitrile and carbon disulfide is smaller than the amount of the aliphatic nitrile when used alone and the amount of organolithium compound is correspondingly smaller than when the aliphatic nitrile is used alone, a polymer having a high cis-1,4 configuration content can be obtained as in the case of a catalyst system consisting of the organolithium compound and the aliphatic nitrile. Further, the molecular weight of the polymer can widely be adjusted by varying the ratio of the catalyst components maintaining the high cis-1,4 configuration content. When carbon disulfide is used, it is preferable to use it in such a proportion that the total of the aliphatic nitrile and the carbon disulfide may be up to 1 mole per carbonlinked lithium atom of the organolithium compound.

Examples of the conjugated diene monomer used in the present invention include 1,3-butadiene, isoprene, 2-ethyl-1,3-butadiene, 1,3-pentadiene, 2-n-propyl-1,3-butadiene, 2,3-dimethyl-1,3-butadiene and 2-n-1,3-butadiene. Among these, 1,3-butadiene and isoprene are used, in general. In particular, this invention is most effectively applied to polymerization of 2-alkyl-substituted 1,3-conjugated dienes, especially isoprene.

According to this invention, there is obtained an isoprene polymer having a reduced trans-1,4 configuration content and a markedly increaed cis-1,4 configuration content in comparison with an isoprene polymer produced with a lithium-based unitary catalyst. Further, an isoprene polymer having a higher molecular weight is obtained with ease than an isoprene polymer produced with a lithium-based unitary catalyst. It should also be noted that the isoprene polymer obtained according to this invention gives, in addition, a tough vulcanizate which is more similar in physical properties to that of a natural Hevea rubber.

Examples of the vinyl aromatic hydrocarbon to be copolymerized with the above-mentioned conjugated diene monomer include styrene, α-methylstyrene, 3-vinyltoluene, divinylbenzene and 1-vinylnaphthalene.

The polymerization reaction is carried out in the presence or absence of a hydrocarbon solvent. Examples of suitable hydrocarbon solvents include paraffinic hydrocarbons, such as butane, pentane, hexane, heptane and octane; naphthenic hydrocarbons such as cyclopentane, cyclohexane and cycloheptane; monoolefinic hydrocarbons such as butene, pentene, hexene and heptene; aromatic hydrocarbons such as benzene, toluene, xylene and ethylbenzene; and mixtures of said hydrocarbons.

The polymerization operation can be effected either in a continuous or batch-wise manner by contacting according to an ordinary procedure the aforesaid monomer with the catalyst according to the present invention.

The pressure of the reaction system may be any pressure so far as the reaction mixture is maintained in the liquid phase, and is ordinarily in the range from atmospheric pressure to 10 atm. The polymerization temperature is preferably in the range from −50° C. to 150° C.

The monomer and the solvent, which are used in the polymerization reaction, should have strictly been freed from water, oxygen and other impurities which deactivate the catalyst. The polymerization reaction is desirably conducted in an atmosphere of such an inert gas as nitrogen, argon or helium.

After completion of the polymerization reaction, the polymerization product is obtained as a solid substance when no solvent has been used, or as a viscous solution or suspension when a solvent has been used. In the latter case, the reaction is terminated by addition of water, alcohol, organic acid or other catalyst-deactivating agent, an antioxidant such as 2,6-di-t-butyl-p-cresol or phenyl-β-naphthylamine is further added, and then the solvent is removed according to an ordinary procedure, whereby the desired polymer can be obtained.

The present invention is illustrated in more detail below with reference to examples.

In each of the examples, the intrinsic viscosity of the polymer was measured in toluene at 30° C. by use of an Ubbelohde's viscometer. The microstructural composition of polyisoprene was measured by means of a high resolution nuclear magnetic resonance spectroscopic method (100 MHz) and the microstructural composition of polybutadiene was measured according to Morero's infrared absorption spectrum method [Chimie et Ind., 41, 758 (1959)]. Further, the content of bonded styrene in the styrene-butadiene copolymer was measured by dissolving 100 mg. of a sample in carbon disulfide to form a solution in an amount of 25 ml. as measured in a messflask, subjecting the solution to infrared absorption spectrum method, and calculating the styrene content according to base line method from the absorbancy at 699 $cm^{-1}$ in the infrared absorption spectrum. In the examples, all percentages (%) and parts are by weight unless otherwise specified.

EXAMPLE 1 AND COMPARATIVE EXAMPLES 1 - 2

Into a 3-liter, stainless steel-made, pressure autoclave, which had been flushed with nitrogen gas, were charged 400 g. of a high purity isoprene monomer and 1,200 g. of n-heptane as a solvent. Subsequently, 2.0 mmol. of n-butyllithium diluted with n-heptane and 0.8 mmol. of acetonitrile were intimately mixed with each other at 35° C. for 2 hours to prepare a catalyst. The thus prepared catalyst was added as it was to the autoclave. Thereafter, the autoclave was tightly closed, and then the inner temperature thereof was maintained at 35° C. while stirring the reaction mixture, whereby the occurrence of polymerization was observed after 10 minutes, and a conversion of 99.5 % was reached after 8 hours. Accordingly, methanol containing phenyl-$\beta$-naphthylamine was added to and sufficiently mixed with the reaction system. The thus formed viscous polymer solution was taken out, freed from the solvent by steam distillation, and then dried to obtain a solid polyisoprene (Example 1).

For comparison, the polymerization of isoprene was carried out in the same manner as above, except that 2.0 mmol. of n-butyllithium only was used as the polymerization catalyst, whereby a conversion of 99.4 % was reached after 5 hours. Accordingly, the resulting polymer solution was treated in the same manner as above to obtain a solid polyisoprene (Comparative Example 1).

For further comparison, the polymerization of isoprene was carried out in the same manner as in Example 1, except that 0.9 mmol. of n-butyllithium only was used as the polymerization catalyst, whereby a conversion of 99.3 % was reached after 10 hours. Accordingly, the resulting polymer solution was treated in the same manner as in Example 1 to obtain a solid polyisoprene (Comparative Example 2).

The above-mentioned 3 kinds of polyisoprene were measured in intrinsic viscosity and microstructural composition to obtain the results as set forth in Table 1.

Table 1

|  | Example 1 | Comparative Example 1 | Comparative Example 2 |
| --- | --- | --- | --- |
| Catalyst |  |  |  |
| n-Butyllithium (mmol.) | 2.0 | 2.0 | 0.9 |
| Acetonitrile (mmol.) | 0.8 | 0 | 0 |
| Polymerization time (hr.) | 8 | 5 | 10 |
| Conversion (%) | 99.5 | 99.4 | 99.3 |
| Microstructural composition |  |  |  |
| Cis-1,4 configuration (%) | 95.6 | 82.6 | 89.0 |
| Trans-1,4 configuration (%) | 1.3 | 11.5 | 6.3 |
| 3,4 configuration (%) | 3.1 | 5.9 | 4.7 |

Table 1-Continued

|  | Example 1 | Comparative Example 1 | Comparative Example 2 |
| --- | --- | --- | --- |
| 1,2 configuration (%) | 0 | 0 | 0 |
| Intrinsic viscosity ([$\eta$]) in toluene at 30°C. (dl/g) | 7.53 | 3.72 | 5.80 |
| Gel content (%) | 0 | 0 | 0 |

From these results, it is understood that the catalyst according to the present invention gives polyisoprene markedly high in cis-1,4 configuration content.

Further, the above-mentioned samples were subjected to roll mixing according to such blending prescription as shown in Table 2 (roll temperature 70° ± 5° C.; blending time 20 minutes).

Table 2

| Blending components | Parts by weight |
| --- | --- |
| Polymer | 100 |
| Carbon black, HAF grade | 50 |
| Aromatic oil | 5.0 |
| Antioxidant | 1.0 |
| Zinc oxide | 3.0 |
| Stearic acid | 2.5 |
| Sulfur | 1.5 |
| Vulcanization accelerator* | 0.6 |

Note: *N-Cyclohexylbenzothiazyl sulfenamide

The thus obtained blends were individually vulcanized at 145° C. for 30 minutes according to an ordinary procedure to obtain vulcanized rubbers having such physical properties as shown in Table 3.

Table 3

| Sample Physical properties* | Example 1 | Comparative Example 1 | Comparative Example 2 |
| --- | --- | --- | --- |
| 300% Modulus (Kg/cm$^2$) | 99 | 79 | 90 |
| Tensile strength (Kg/cm$^2$) | 298 | 210 | 251 |
| Elongation (%) | 700 | 720 | 720 |
| Tear strength (Kg/cm$^2$) | 67 | 44 | 52 |
| Hardness | 58 | 56 | 57 |

* The physical properties were measured under the conditions specified in JIS K-6301.

From the results shown in Table 3, it is understood that the polyisoprene obtained by use of the catalyst of the present invention can give a tough vulcanizate.

EXAMPLES 2 - 5 AND COMPARATIVE EXAMPLE 3

Into each of five stainless steel-made pressure autoclaves of 4 liters in volume, which had been flushed with nitrogen gas, were charged 500 g. of high purity isoprene and 1,500 g. of n-pentane. Subsequently, catalysts were prepared by intimately mixing at 25° C. for 1 hour n-butyllithium with acetonitrile or butyronitrile in such proportions as shown in Table 4. These catalysts were individually fed to each of the five autoclaves, and the polymerization of isoprene was carried out in the same manner as in Example 1 to obtain five kinds of polyisoprene. The thus obtained polymers were measured in intrinsic viscosity and microstructural composition to obtain the results as set forth in Table 4.

Table 4

|  | Comparative Example 3 | Example 2 | Example 3 | Example 4 | Example 5 |
|---|---|---|---|---|---|
| Catalyst |  |  |  |  |  |
| n-Butyllithium (mmol.) | 3.0 | 3.0 | 3.0 | 3.0 | 3.0 |
| Acetonitrile (mmol.) | 0 | 0.5 | 1.2 | 1.5 | — |
| n-Butyronitrile (mmol.) | — | — | — | — | 1.5 |
| Polymerization temperature (°C.) | 35 | 35 | 35 | 35 | 35 |
| Polymerization time (hr.) | 4 | 5 | 6.5 | 8 | 7 |
| Conversion (%) | 99.9 | 99.8 | 99.9 | 98.6 | 99.6 |
| Microstructural composition |  |  |  |  |  |
| Cis-1,4 configuration (%) | 79.3 | 86.1 | 94.5 | 96.0 | 93.0 |
| Trans-1,4 configuration (%) | 14.0 | 8.7 | 1.5 | 0.9 | 4.7 |
| 3,4 configuration (%) | 6.7 | 5.2 | 4.0 | 3.1 | 4.3 |
| 1,2 configuration (%) | 0 | 0 | 0 | 0 | 0 |
| Intrinsic viscosity ([$\eta$]) in toluene at 30°C. (dl/g) | 2.81 | 3.57 | 5.51 | 7.04 | 5.09 |
| Gel content (%) | 0 | 0 | 0 | 0 | 0 |

EXAMPLES 6 – 8 AND COMPARATIVE EXAMPLES 4 – 6

Into each of six stainless steel-made pressure autoclaves of 4 liters in volume, which had been flushed with nitrogen gas, were charged 400 g. of a high purity 1,3-butadiene monomer and 1,600 g. of n-heptane. Subsequently, catalysts were prepared by intimately mixing at 30° C. for 1 hour n-butyllithium with acetonitrile in such proportions as shown in Table 5. These catalysts and a control catalyst comprising only n-butyllithium were individually fed to each of the six autoclaves. After tightly closing the autoclave, polymerization was carried out at 40° C. while stirring the content of the autoclave. The conversion was measured every 30 minutes, and when no substantial increase in conversion was observed, ethanol containing 4 g. of phenyl-$\beta$-naphthylamine was added to and sufficiently mixed with the reaction system to form a viscous polymer solution. The thus formed polymer solution was taken out, freed from the solvent by steam distillation and then dried. In the above manner five kinds of polybutadiene were obtained. These polymers were measured in microstructural composition, intrinsic viscosity and gel content to obtain the results as set forth in Table 5.

claves of 4 liters in volume, which had been flushed with nitrogen gas, was charged 2,000 g. of C$_5$-fraction hydrocarbons of cracked naphtha of such a composition as shown in Table 6.

Table 6

| Composition of C$_5$-fraction |  |
|---|---|
| Components | % |
| 1,4-Pentadiene | 0.02 |
| Isopentane | 3.26 |
| 1-Pentene | 3.87 |
| 2-Methyl-1-butene | 13.02 |
| Isoprene | 25.13 |
| n-Pentane | 44.61 |
| 2-Pentene | 6.84 |
| 2-Methyl-2-butene | 2.58 |
| 1,3-Pentadiene | 0.12 |
| Cyclopentene | 0.05 |
| Others | Less than 0.50 |
| $\alpha$-Acetylenes* | < 5 |
| $\beta$-Acetylenes* | 70 |
| Allens* | < 10 |
| Cyclopentadiene* | < 5 |

* Concentration in terms of p.p.m.

Into the first autoclave, 4.0 mmol. of n-butyllithium and 1.8 mmol. of acetonitrile were charged after intimately mixing the two at 25° C. for 30 minutes (Exam- Table 5

|  | Example 6 | Example 7 | Example 8 | Comparative Example 4 | Comparative Example 5 | Comparative Example 6 |
|---|---|---|---|---|---|---|
| Catalyst |  |  |  |  |  |  |
| n-Butyllithium (mmol.) | 2.5 | 2.0 | 3.5 | 2.0 | 2.5 | 2.0 |
| Acetonitrile (mmol.) | 1.0 | 0.6 | 1.5 | 0 | 0 | 3.0 |
| Polymerization time (hr.) | 6 | 5 | 4.5 | 4 | 3 | 6 |
| Conversion (%) | 99.5 | 99.1 | 99.8 | 99.6 | 99.5 | 0* |
| Microstructural composition |  |  |  |  |  |  |
| Cis-1,4 configuration (%) | 60.5 | 48.4 | 56.0 | 37.4 | 35.6 | — |
| Trans-1,4 configuration (%) | 32.5 | 42.6 | 36.3 | 52.1 | 53.9 | — |
| Vinyl configuration (%) | 7.0 | 9.0 | 7.7 | 10.5 | 10.5 | — |
| Intrinsic viscosity ([$\eta$]) in toluene at 30°C. (dl/g) | 4.70 | 3.02 | 4.01 | 2.65 | 2.08 | — |
| Gel content (%) | 0 | 0 | 0 | 0 | 0 | — |

* In Comparative Example 6, no polymerization reaction took place at all.

From the results shown in Table 5, it is understood that the catalyst according to the present invention gives polybutadiene having a higher cis-1,4 configuration content than with n-butyllithium alone.

EXAMPLES 9 – 10 AND COMPARATIVE EXAMPLE 7

Into each of three stainless steel-made pressure autople 9). Into the second autoclave, 1.8 mmol. of acetonitrile was first charged and, after sufficiently mixing the acetonitrile with the C$_5$-fraction, 4.0 mmol. of n-butyllithium was further charged (Example 10). Into the third autoclave, 4.0 mmol. of n-butyllithium only was charged (Comparative Example 7). Immediately thereafter, the individual autoclaves were tightly closed to carry out the selective polymerization of isoprene in the $C_5$-fraction. Three kinds of polyisoprene obtained in the above manner were measured in microstructural composition, intrinsic viscosity and gel content to obtain the results as set forth in Table 7.

Table 7

|  | Example 9 | Example 10 | Comparative Example 7 |
|---|---|---|---|
| Polymerization conditions | | | |
| Polymerization temperature (°C) | 30 | 30 | 30 |
| Polymerization time (hr.) | 5 | 4.5 | 3 |
| Conversion (%) | 99.8 | 99.7 | 99.8 |
| Microstructural composition | | | |
| Cis-1,4 configuration (%) | 93.4 | 92.5 | 76.4 |
| Trans-1,4 configuration (%) | 2.6 | 3.4 | 16.8 |
| 3,4 configuration (%) | 4.0 | 4.1 | 6.8 |
| 1,2 configuration (%) | 0 | 0 | 0 |
| Intrinsic viscosity ($[\eta]$) in toluene at 30°C. (dl/g) | 5.71 | 5.42 | 2.10 |
| Gel content (%) | 0 | 0 | 0 |

EXAMPLE 11 AND COMPARATIVE EXAMPLE 8

Into a 4-liter stainless steel-made pressure autoclave, which had been flushed with nitrogen, were charged 80 g. of a high purity styrene monomer, 320 g. of a butadiene monomer and 1,600 g. of cyclohexane as a solvent. To the autoclave was then fed a catalyst prepared by intimately mixing 3.0 mmol. of iso-butyllithium with 1.0 mmol. of acetonitrile at 25° C. for 1 hour. Thereafter, the autoclave was tightly closed, and polymerization was effected while stirring and while maintaining the inner temperature of the autoclave at 35° C., whereby a conversion of 99.6 % was reached after 6 hours. The resulting polymer solution was mixed with methanol containing phenyl-β-naphthylamine, freed from the solvent by steam distillation and then dried to obtain a solid styrene-butadiene copolymer (Example 11).

For comparison, the copolymerization of styrene with butadiene was carried out under the same conditions as above, except that 3.0 mmol. of isobutyllithium only was used as the polymerization catalyst, whereby a conversion of 99.3 % was reached after 4 hours. Accordingly, the resulting polymer solution was treated in the same manner as in Example 11 to obtain a solid styrene-butadiene copolymer (Comparative Example 8).

The thus obtained samples were measured in microstructural composition, intrinsic viscosity, bonded styrene content and gel content to obtain the results as set forth in Table 8.

Table 8

| Sample<br>Measured item | Example 11 | Comparative Example 8 |
|---|---|---|
| Microstructural composition of polymerized butadiene portion | | |
| Cis-1,4 configuration (%) | 46.3 | 34.2 |
| Trans-1,4 configuration (%) | 44.5 | 54.8 |
| Vinyl configuration (%) | 9.2 | 11.0 |
| Bonded styrene content (%) | 19.8 | 19.9 |
| Intrinsic viscosity ($[\eta]$) in toluene at 30°C. (dl/g) | 1.96 | 1.53 |
| Gel content (%) | 0 | 0 |

EXAMPLES 12 – 15

Into each of four 4-liter, stainless steel-made pressure autoclaves, which had been flushed with nitrogen gas, were charged 500 g of high purity isoprene and 1,500 g. of n-heptane, and then a catalyst obtained by mixing an n-butyllithium solution in n-heptane (0.8 mol/l.) with carbon disulfide (0.1 mol/l. solution in n-heptane) and acetonitrile (0.1 mol/l. solution in n-heptane) in given amounts and ageing the resulting mixture at 35° C for 15 hrs., after which polymerization of isoprene was effected in the same manner as in Example 1 to obtain four kinds of polyisoprene. The results obtained are shown in Table 9.

Table 9

|  | Example 12 | Example 13 | Example 14 | Example 15 |
|---|---|---|---|---|
| Catalyst | | | | |
| n-Butyllithium (mmol.) | 2.58 | 2.58 | 2.58 | 2.13 |
| Carbon disulfide (mmol.) | 0 | 0.52 | 0.26 | 0.21 |
| Acetonitrile (mmol.) | 0.90 | 0.10 | 0.52 | 0.42 |
| Polymerization temperature (°C) | 35 | 35 | 35 | 35 |
| Polymerization time (hr.) | 8.0 | 7.0 | 7.5 | 8.0 |
| Conversion (%) | 99.4 | 99.5 | 99.7 | 99.8 |
| Microstructural composition | | | | |
| Cis-1,4 configuration (%) | 94.0 | 94.8 | 92.3 | 94.3 |
| Trans-1,4 configuration (%) | 1.8 | 1.3 | 3.4 | 1.5 |
| 3,4 configuration (%) | 4.2 | 3.9 | 4.3 | 4.2 |
| $[\eta]$30°C toluene (dl/g) | 5.5 | 6.2 | 4.7 | 6.0 |
| Gel content (%) | 0 | 0 | 0 | 0 |

What is claimed is:

1. A process for producing a conjugated diene polymer by homopolymerizing or copolymerizing at least one conjugated diene or copolymerizing at least one conjugated diene and at least one vinyl aromatic hydrocarbon with a lithium-based catalyst, characterized in that the monomer or monomers are contacted with a catalyst consisting essentially of at least one organolithium compound and at least one aliphatic nitrile having the formula, RCN in which R is alkyl of one to six carbon atoms, in a proportion of 0.01 to 1.0 mole of the aliphatic nitrile per carbon-linked lithium atom.

2. A process according to claim 1, wherein the amount of the catalyst is 0.01 to 100 milligram equivalent in terms of carbon-linked lithium per mole of the monomer or monomers.

3. A process according to claim 1, wherein the polymerization is effected under a pressure of from atmospheric pressure to 10 atmospheres at a temperature of from −50° C to +100° C.

4. A process according to claim 1, wherein the polymerization is effected under an inert atmosphere.

5. A process according to claim 1, wherein the conjugated diene monomer is selected from the group consisting of 1,3-butadiene, isoprene, 2-ethyl-1,3-butadiene, 1,3-pentadiene, 2-n-propyl-1,3-butadiene, 2,3-dimethyl-1,3-butadiene and 2-n-butyl-1,3-butadiene.

6. A process according to claim 1, wherein the conjugated diene is 2-alkyl-substituted-1,3-conjugated diene.

7. A process according to claim 1, wherein the conjugated diene is isoprene.

8. A process according to claim 1, wherein the vinyl aromatic hydrocarbon is selected from the group consisting of styrene, α-methylstyrene, 3-vinyltoluene, divinylbenzene and 1-vinylnaphthalene.

9. A process according to claim 1, wherein the reaction is effected in the presence of a hydrocarbon solvent selected from the group consisting of paraffinic hydrocarbons, naphthenic hydrocarbons, monoolefinic hydrocarbons, aromatic hydrocarbons and mixtures of these hydrocarbons.

10. A process according to claim 9, wherein the hydrocarbon solvent is butane, pentane, hexane, heptane, octane, cyclopentane, butene, pentene, hexene, heptene, benzene, toluene or xylene.

11. A process according to claim 1, wherein the organolithium compound is a monolithium compound, a polylithium compound or a mixture thereof.

12. A process according to claim 1, wherein the organolithium compound is methyllithium, ethyllithium, propyllithium, butyllithium, amyllithium, hexyllithium, phenyllithium, naphthyllithium, methylenedilithium, ethylenedilithium, trimethylenedilithium, tetramethylenedilithium, 1,4-dilithiumbenzene, diisopropenyldilithium, dibutadienyldilithium or distyrenyldilithium.

13. A process according to claim 1, wherein the organolithium compound is n-butyllithium.

14. A process according to claim 1, wherein the aliphatic nitrile is selected from the group consisting of acetonitrile, propionitrile, butyronitrile, valeronitrile, capronitrile and enanthonitrile.

15. A process according to claim 1, wherein the aliphatic nitrile is acetonitrile.

16. A process according to claim 1, wherein the organolithium compound and the aliphatic nitrile are first mixed together and then added to the monomers.

17. A process according to claim 1, wherein the organolithium compound and the aliphatic nitrile are separately added to the monomers.

18. A process for producing a conjugated diene polymer by homopolymerizing or copolymerizing at least one conjugated diene or copolymerizing at least one conjugated diene and at least one vinyl aromatic hydrocarbon with a lithium-based catalyst, characterized in that the monomer or monomers are contacted with a catalyst consisting essentially of at least one organolithium compound, at least one aliphatic nitrile having the formula, RCN, wherein R is alkyl of one to six carbon atoms, and carbon disulfide, in a proportion of 0.01 to 1.0 mole of the aliphatic nitrile per carbon-linked lithium atom and in such a proportion that the total of the aliphatic nitrile and the carbon disulfide is up to 1 mole per carbon-linked lithium atom of the organolithium compound.

* * * * *